Figure 1:
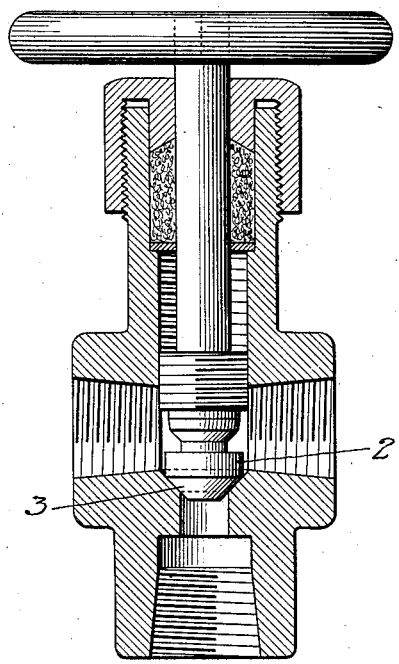

July 22, 1930.  W. S. IRELAND  1,771,043

VALVE MEMBER

Filed April 28, 1926

AG: 8% TO 14%
SN: 92% TO 86%

Witness
R. B. Davison

Inventor
Ward S. Ireland
By Ira J. Wilson
Atty.

Patented July 22, 1930

1,771,043

UNITED STATES PATENT OFFICE

WARD S. IRELAND, OF BELOIT, WISCONSIN, ASSIGNOR TO NATIONAL REFRIGERATION CORPORATION, OF BELOIT, WISCONSIN, A CORPORATION OF WISCONSIN

VALVE MEMBER

Application filed April 28, 1926. Serial No. 105,267.

This invention relates in general to valve members and structures and has for its primary purpose the production of a new and improved valve seating element composed of an alloy capable of use for many purposes.

In some types of fluid control apparatus, such as mechanical refrigeration systems for instance, an extremely tight and leak-proof fit between a valve and its seat is essential to successful operation. Furthermore this tight fit must be maintained over long periods of usage and the valve should therefore, in order to be satisfactory, be capable of maintaining a tight leak-proof fit over long periods without the necessity for repairs or replacement.

In order to accomplish these results, the valve seating element, or the valve head for example should be made of a metal sufficiently soft as to be capable of conforming to irregularities in the surface of the seat with which it contacts and at the same time it should posses sufficient resiliency to prevent its permanent distortion under the heavy pressure exerted when the valve is forced with a wrench against its seat. The seating element should also be of sufficient toughness or hardness to resist wear.

With the view of producing a valve capable of successfully meeting the onerous conditions of mechanical refrigeration, I have after prolonged experimentation devised an alloy which when embodied in a valve gives satisfactory service over prolonged periods under the adverse conditions encountered. This alloy, while comparatively hard and capable of resisting wear and abrasive action has sufficient softness to conform to hard irregularities, and possesses at the same time a relatively high coefficient of elasticity enabling it to conform itself to a limited degree to inequalities and irregularities in the valve seat without permanent deformation, thereby facilitating a leak-proof fit.

Figure 2:
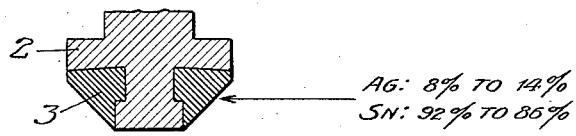

In the drawing:

Fig. 1 is a vertical sectional view of a valve showing one embodiment of my invention, and Fig. 2 is an enlarged fragment in section of a closure member of the valve of Fig. 1, showing one manner of using an alloy seat.

The alloy which I have devised for valve use is composed of two constituents, namely, tin and silver, the tin being predominant and combined with sufficient silver to produce the desired results. For the particular purpose above mentioned as illustrating one use of my invention, I prefer to employ an alloy having as its basic constituents tin and silver in proportions, for example 88.5% tin and 11.5% silver but comparatively satisfactory results may be obtained with some variations of these proportions as for instance from 8 to 14% silver combined with 92 to 86% tin.

The two metals are thoroughly mixed together in molten condition until an homogeneous composition or mixture is attained, whereupon the resultant alloy may be cast in any desired shape and may be machined or otherwise worked if necessary.

The alloy thus produced is non-ferreous and consequently rust-proof so that any danger of leakage resulting from corrosion of the contacting surface or the depositing of rust particles between the opposed surfaces is obviated.

I have illustrated a simple type of valve in which in the embodiment a valve closure member 2 is provided with a seat 3 composed of an alloy such as that disclosed herein. The drawing being self-explanatory, further description thereof is deemed unnecessary.

While I have described the preferred construction and the proportions of the constituents of my invention, it should be understood that some latitude of variation in these proportions is contemplated within the scope of my invention as defined in the following claims.

I claim:

1. In a valve seating element, an alloy consisting of the following ingredients substantially in the proportions specified: silver 8 to 14% and tin 92 to 86%, respectively.

2. In a valve seating element, a non-ferreous alloy consisting of tin and silver in which there is at least six times as much tin as silver.

3. In a valve structure, a non-ferreous alloy consisting of tin and silver in such proportions that the alloy is sufficiently soft to conform under pressure of an opposed surface to the shape of such opposed surface and yet be sufficiently resilient to preclude permanent distortion thereof under such pressures.

4. A valve comprising a casing having a valve seat formed therein, a stem journaled in said casing, a closure member carried by said stem, and an alloy seat carried by said closure member, the alloy of said seat being of sufficient softness to conform to irregularities caused by foreign particles on said valve seat and of sufficient resilence to prevent its permanent distortion.

5. A valve adaptable for use in refrigeration systems comprising a casing having a seat portion, and a closure member in said casing cooperative with said seat portion, one of said portions being formed of an alloy comprising tin and silver in proportions sufficient to impart to it high resiliency and sufficient softness to yield to hard, firm particles caught between the seating portions.

6. A valve comprising a casing having a seat portion, a stem in said casing provided with a closure portion cooperative with said seat portion, one of said portions being composed of an alloy, said alloy having a relatively high resilience and sufficient softness in order to conform itself within a limited degree to the inequalities of the opposing portion and possessing sufficient toughness to resist wear and abrasive action.

In witness of the foregoing I affix my signature.

WARD S. IRELAND.